J. F. J. ARCHIBALD AND G. A. WOODMAN.
AUTOMOBILE SIGNAL.
APPLICATION FILED APR. 9, 1917.
1,303,147.
Patented May 6, 1919.
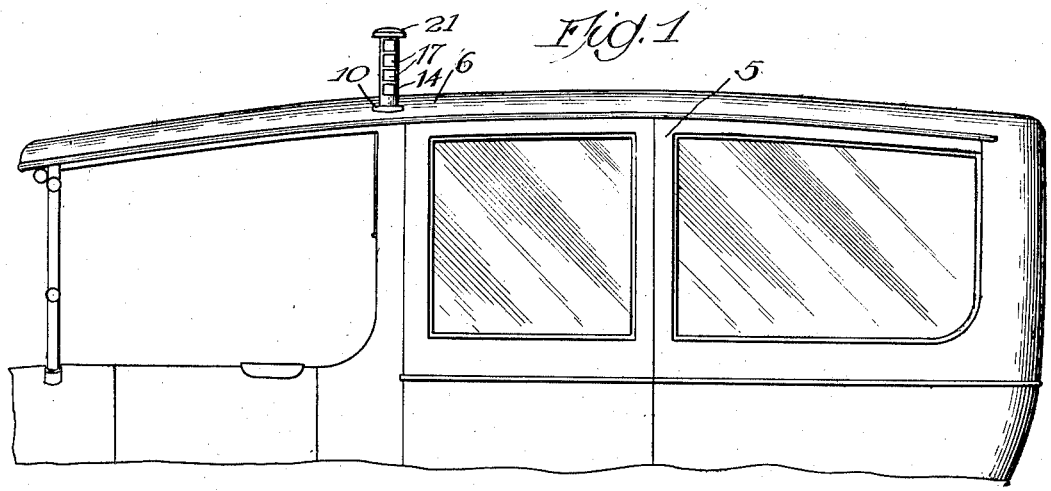
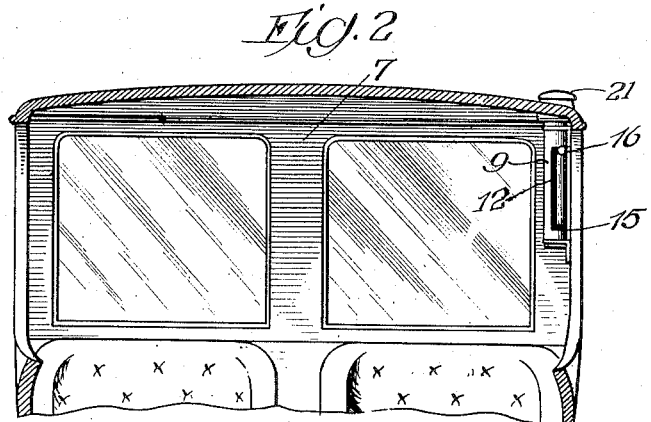
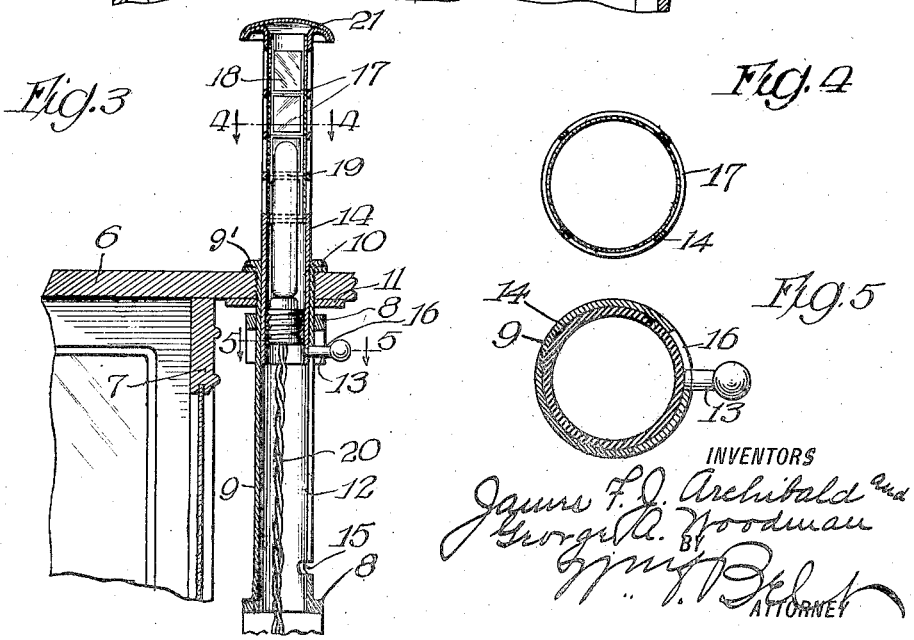
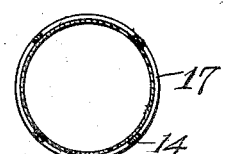
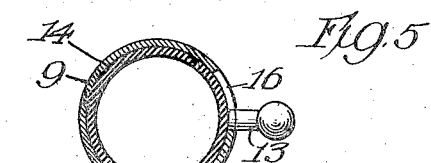

UNITED STATES PATENT OFFICE.

JAMES F. J. ARCHIBALD, OF NEW YORK, N. Y., AND GEORGE A. WOODMAN, OF CHICAGO, ILLINOIS.

AUTOMOBILE-SIGNAL.

1,303,147.　　　　　Specification of Letters Patent.　　Patented May 6, 1919.

Application filed April 9, 1917. Serial No. 160,656.

*To all whom it may concern:*

Be it known that we, JAMES F. J. ARCHIBALD and GEORGE A. WOODMAN, citizens of the United States, residing at New York city, in the county of New York and State of New York, and Chicago, in the county of Cook and State of Illinois, respectively, have invented certain new and useful Improvements in Automobile-Signals, of which the following is a specification.

This invention relates to a novel signaling device for automobiles and has for its object the provision of means whereby an owner may identify his automobile at night from a distance and means whereby the identification device may be inconspicuously disposed when not in use.

Further objects and advantages of our invention will be apparent as it is better understood by reference to the following specification when read in connection with the accompanying drawing, illustrating the preferred embodiment thereof, in which—

Figure 1 is a side elevation of a portion of an automobile illustrating our invention in signaling position;

Fig. 2 is a transverse section through the structure illustrated in Fig. 1 illustrating our device in non-signaling position;

Fig. 3 is an enlarged section through the signaling device illustrating the manner of supporting it;

Fig. 4 is an enlarged section on the line 4—4 of Fig. 3, and

Fig. 5 is an enlarged section on the line 5—5 of Fig. 3.

Referring to the drawing, 5 indicates the body of an automobile of usual design having a permanent roof 6. A wall 7 may divide the front and rear compartments of the body. The particular structure of the body forms no part of our present invention and is represented in the drawing for illustrative purposes merely.

Mounted in brackets 8 secured to a side wall of a forward compartment or, if desired, to the dividing wall 7, but preferably adjacent the driver's seat is a cylindrical support 9 extending through the roof 6. The upper end of the support is turned outward to form a flange 9' which engages a collar 10 on the support 9 above the roof 6. A clamping collar 11 is threadedly mounted on the support 9 and engages the under side of the roof 6 and can be adjusted to secure the support rigidly to the roof, insuring a tight joint and preventing rattling. The support 9 is slotted at 12 to receive an operating handle 13 secured to the lower end of a frame 14 which is slidably mounted and vertically movable within the support. The slot 12 is provided with notches 15 and 16 at either end to receive and hold the handle 13 when the frame 14 is in raised or lowered position.

The frame 14 is preferably cylindrical and is provided with a plurality of sets of openings 17 arranged one above the other, the openings of each set being disposed circumferentially about the cylindrical frame. The openings are provided with transparent windows preferably formed by mounting short sections 18 of glass tubing one above the other within the frame. Illuminating means 19, preferably an electric lamp, is mounted within the frame and is supplied with current through conductors 20 from any suitable source thereof.

In order that the owner of a vehicle may recognize the same from a distance at night it is desirable to provide suitable illuminated identification means thereon and we have conceived the idea of providing a signaling means above described with windows arranged in various color combinations, each of which is different. Thus in the embodiment of the invention herein illustrated we have provided four sets of transparent windows, each set being preferably of different color, for example red, blue, white and yellow, arranged in the order named. When the device is disposed in signaling position the owner of the automobile would immediately recognize the combination and could thus readily locate the vehicle from a distance of upward to a city block. This is of especial convenience at the theater where it is frequently necessary for the owner to await his turn while the starter calls the numbers of the various vehicles. It is our intention that each signaling device sold in any particular city shall have a different color combination so that there will be no liability of confusion in the use of our device. Obviously other colors than those enumerated may be employed and the colors may be arranged in innumerable combinations.

Normally the frame 14 is dropped in the support 9 until the handle 13 engages the notch 15 in which position the cap 21 at the upper end of the frame 14 projects outward sufficiently to cover the upper end of the support 9 and prevents the entrance of water between the frame 14 and the support 9. The cap 21, moreover, presents a finished appearance so that the device is not conspicuous in the daytime. When it is desired to use the device it is lifted until the handle 13 engages the notch 16, in which position the windows are exposed and the illuminating means 19 being in operation the combination of colored windows may be seen from all directions, thus clearly identifying the particular vehicle to persons familiar with the combination.

From the foregoing it will be readily understood that we have perfected a simple and relatively inexpensive signaling device which serves a very useful purpose and that various changes may be made in the form, construction and arrangement of the parts without departing from the spirit and scope of the invention or sacrificing any of its material advantages, the form hereinbefore described being merely a preferred embodiment thereof.

I claim:

1. An identification signal for automobiles comprising a vertically disposed support adapted to be secured to an automobile body provided with a roof, a frame slidably mounted in said support and projecting through the roof of said body, said frame being provided with a plurality of transparent windows arranged one above the other, illuminating means in said frame, means for securing said frame in signaling position, and a cap on said frame having a projecting flange to close the opening in said roof when said casing is in non-signaling position.

2. An identification signal for automobiles comprising a fixed support adapted to be secured to the body of an automobile, a frame movably mounted thereon and having a plurality of sets of transparent windows, each set being arranged about said frame whereby one or more windows is visible from any direction, and the windows of contiguous sets being of different color, illuminating means within said frame, and means for securing said frame in signaling position on said support.

3. An identification signal for automobiles comprising a vertically arranged inclosing support adapted to be secured to an automobile body provided with a roof, a frame slidably mounted in said support and adapted to be projected therefrom through said roof, said frame being provided with a plurality of transparent windows arranged one above the other, contiguous windows being of different color, illuminating means in said frame, and means for securing said frame in signaling position.

4. An identification signal for automobiles comprising a fixed support adapted to be secured to the body of an automobile, a frame movably mounted thereon having a plurality of sets of openings arranged one above the other, the openings being disposed about said frame whereby one or more openings is visible from any direction, and a plurality of short sections of glass tubing in said frame, contiguous sections being of different color, said sections forming transparent coverings for said openings, and illuminating means within said frame.

5. An identification signal for automobiles comprising a vertically disposed inclosing support adapted to be secured to an automobile body provided with a roof, a frame slidably mounted in said support and adapted to be projected therefrom through said roof, said frame having a plurality of sets of openings arranged thereabout so that one or more openings of each set is visible from any direction, a plurality of sections of glass tubing each of a different color arranged within said frame and forming transparent coverings for said openings, illuminating means within said frame, and means for securing said frame in signaling position.

JAMES F. J. ARCHIBALD.
GEORGE A. WOODMAN.

Witnesses:
Wm. F. Belt,
M. A. Kiddie.